E. V. MYERS.
SHOCK ABSORBER.
APPLICATION FILED OCT. 16, 1915.
1,335,290.
Patented Mar. 30, 1920.
4 SHEETS—SHEET 1.
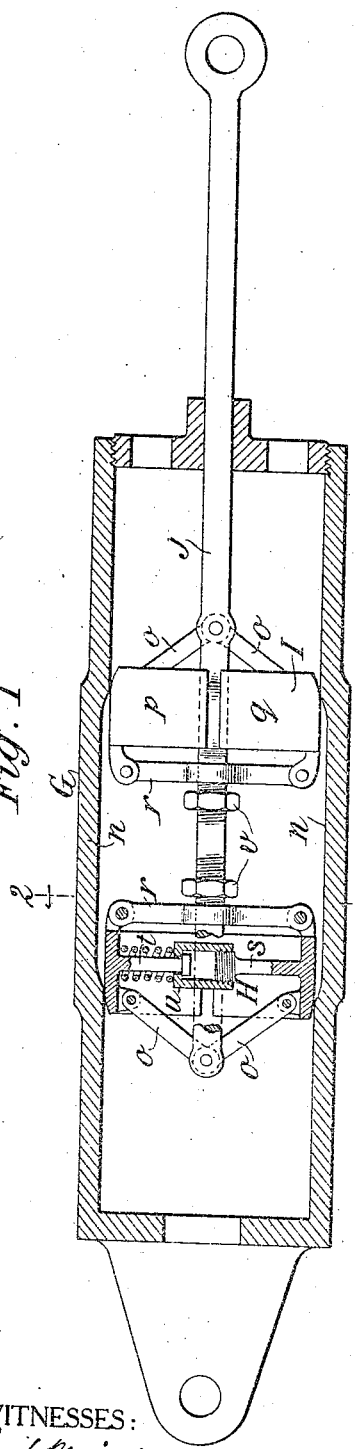
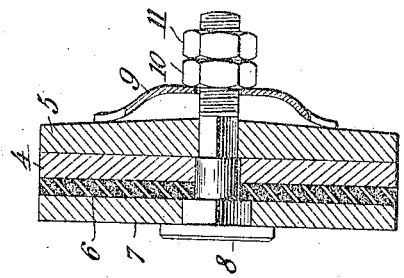
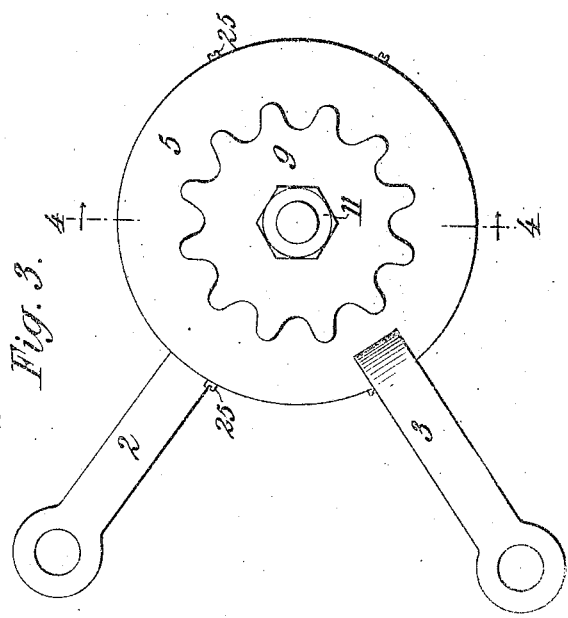
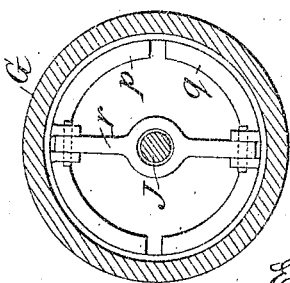
WITNESSES:
INVENTOR
Eugene V. Myers,
By Attorneys, E. V. MYERS.
SHOCK ABSORBER.
APPLICATION FILED OCT. 16, 1915.
1,335,290.
Patented Mar. 30, 1920.
4 SHEETS—SHEET 2.
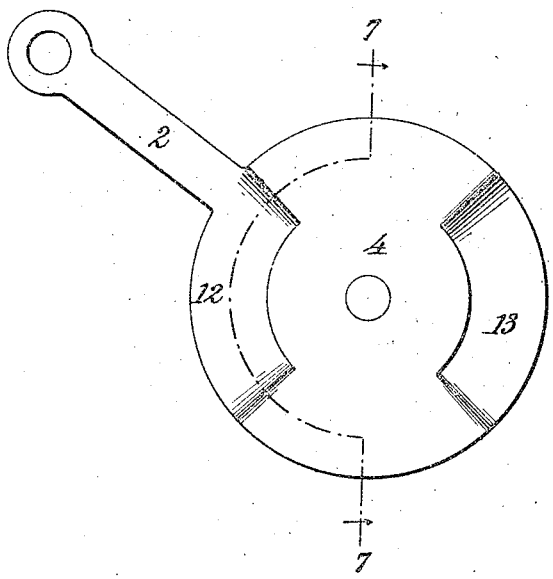
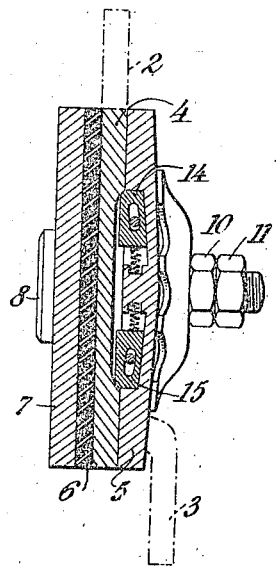
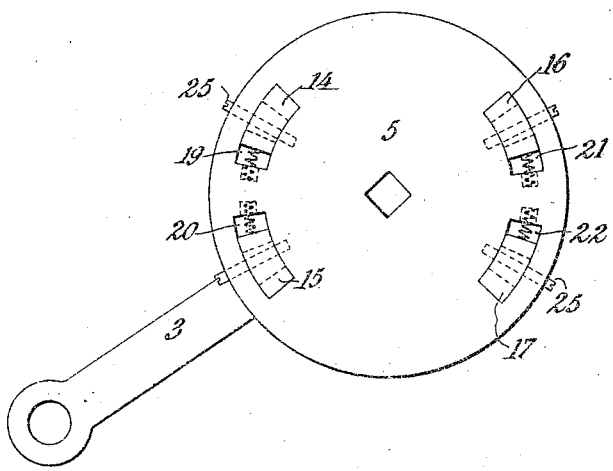
WITNESSES:
René Bruine
Fred White
INVENTOR
Eugene V. Myers
By Attorneys,
Fraser, Funk & Myers

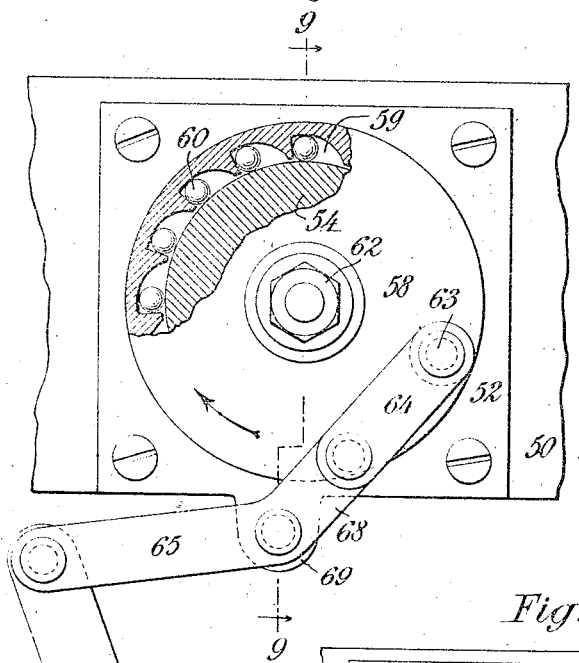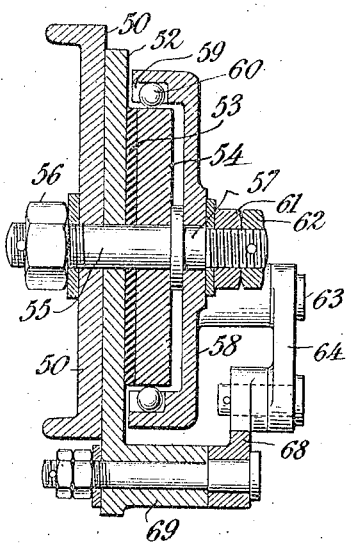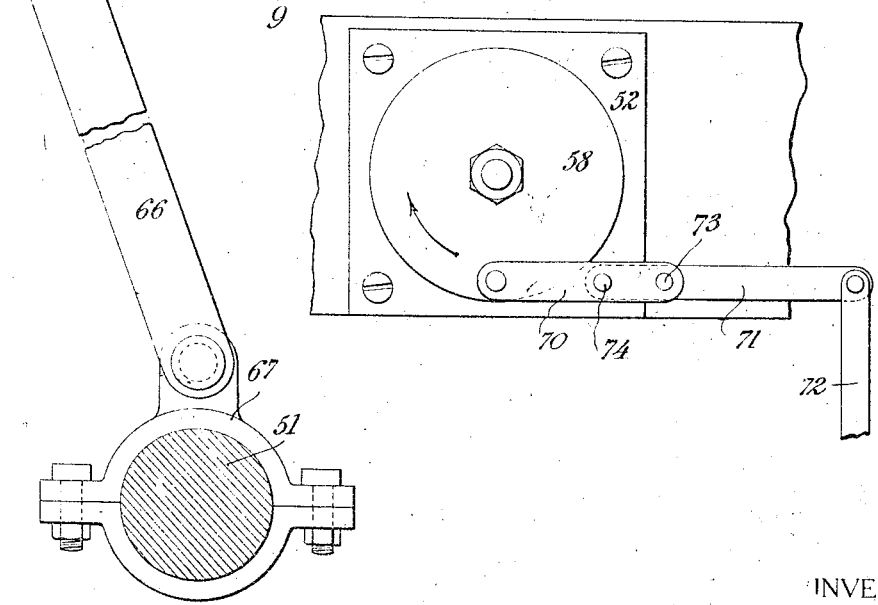

E. V. MYERS.
SHOCK ABSORBER.
APPLICATION FILED OCT. 16, 1915.

1,335,290.

Patented Mar. 30, 1920.
4 SHEETS—SHEET 4.

UNITED STATES PATENT OFFICE.

EUGENE V. MYERS, OF EAST ORANGE, NEW JERSEY.

SHOCK-ABSORBER.

1,335,330.

Specification of Letters Patent.   Patented Mar. 30, 1920.

Application filed October 16, 1915. Serial No. 56,216.

*To all whom it may concern:*

Be it known that I, EUGENE V. MYERS, a citizen of the United States of America, residing in East Orange, in the county of Essex and State of New Jersey, have invented certain new and useful Improvements in Shock-Absorbers, of which the following is a specification.

This application is in part a division of my application filed November 17, 1906, Serial No. 343,831.

The invention relates to so-called shock absorbers, for automobiles and other vehicles, and aims to provide certain improvements therein.

In motor cars or other vehicles having springs the latter are normally at a considerable tension due to the weight of the body of the vehicle and the occupants. When a "bump" or temporary elevation is encountered the first effect is to compress the spring still farther, as the car body tends to maintain the position in a horizontal plane in which it is moving, this being particularly true when the car is in rapid motion. The secondary effect which closely follows the compression of the spring is that the car body is thrown violently upward due to the reaction of the spring. When a depression in the road-bed is encountered a reverse movement takes place. The car body tends as before to maintain its horizontal plane, and the running gear tends to drop away from the body, this action taking place because the spring is relieved temporarily from the weight of the body. The latter being temporarily unsupported gravity overcomes its inertia and it moves downward violently compressing the springs beyond their normal condition. It has been the practice heretofore to provide an absorber adapted to check such violent reactions of the spring, but such absorbers have been so constructed that they act at all times during both the action and reaction of the spring. Obviously, any drag which is placed upon the spring during what may be called its "action," that is to say, during its yielding movement when the wheels pass over an elevation or depression, partially destroy the action of the spring. Theoretically the spring should be as yielding as possible during such action and should not be stiffened by the interposition of any retarding device during such time.

According to my invention in its preferred form I provide a shock absorber which is adapted to permit the spring to yield freely without any retarding effect in either direction from its normal condition. When, however, the running gear and body seek to resume their normal relative positions a retarding effect is produced which permits them to resume such positions gradually so that a secondary violent movement of the car body is avoided. By my invention, however, a lesser degree of retardation may be imposed upon the spring during its primary movements and a greater degree during the secondary movements, if desired. So also the absorber may be constructed in such manner that no retarding effect is placed upon the spring during those slight movements which occur from minor variations in the road-bed, the retarding effect being introduced only in the major movements of the spring and body and such retarding effect may be produced as just stated, or may be imposed during both the primary and secondary movements. My invention also renders it possible to graduate the degree of retardation so that it is less during the minor movements of the parts and greater during the major movements thereof. In its preferred form my invention provides an absorber which permits the use of a very flexible spring with the minimum danger of breakage of the latter and at the same time one in which the minimum jarring effect is transmitted to the car body. All danger of crystallization of the axle is avoided and wear upon the tire and shock to the running gear and driving mechanism is reduced. The invention is applied to a frictional absorber, or one which does not depend upon hydraulic means to secure the retarding effect.

In the drawings, wherein I have shown several embodiments of my invention,—

Figure 1 is a central vertical section partly in elevation showing one form of the invention.

Fig. 2 is a cross section on the line 2—2 of Fig. 1.

Fig. 3 is a side elevation of another form of the invention.

Fig. 4 is a section on the line 4—4 in Fig. 3.

Fig. 5 is an inner face view of one of the parts of Fig. 3.

Fig. 6 is an inner face view of the complementary part.

Fig. 7 is a sectional view taken on the line 7—7 in Fig. 5.

Fig. 8 is an elevation partly in section of another form of the invention.

Fig. 9 is a sectional view of Fig. 8 on the line 9—9.

Fig. 10 is an elevation of another form of the invention.

Figure 11:
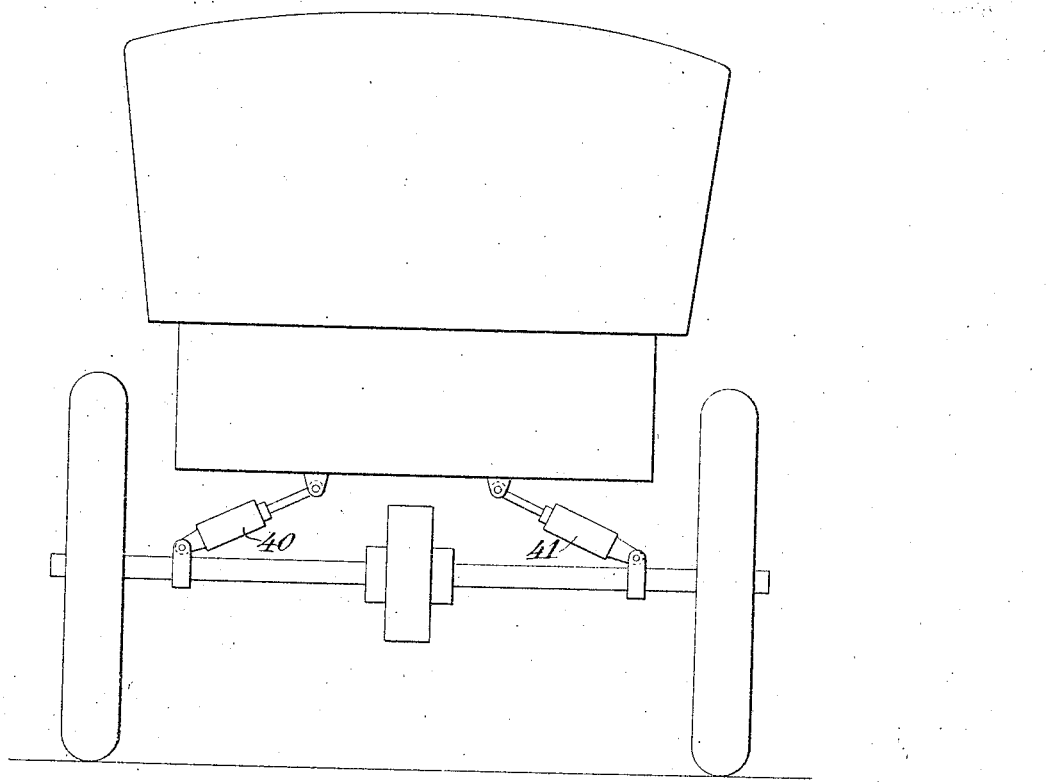
Fig. 11 is a rear view of a vehicle showing one application of my invention.

Referring first to Figs. 1 and 2, let G indicate a cylindrical or other casing having its bore enlarged at $n$. In the cylinder G work two expansible pistons or friction devices H and I. J is a rod adapted to be pivoted to the car body and connected to the pistons H by toggles $o$, $o$ which are pivoted to the semi-cylindrical sections $p$ $q$ of the pistons. The two sections of each piston are pivoted to a cross bar $r$ through which the rod J works. Each section is provided with an arm $s$ or $t$, one of which, as $s$ is screw threaded to receive a sleeve $u$ which engages a head formed on the opposite arm $t$. By screwing the sleeve upwardly or downwardly the limit of motion of the sections $p$ $q$ is adjusted. The device illustrated in Fig. 1 works as follows:

Each piston may move freely toward its end of the cylinder and is expanded on the return stroke toward normal position. When one piston is moved toward the end of the cylinder the opposite piston plays idly in the expanded bore $n$, notwithstanding that its toggle is being moved to press the sections apart. Nuts $v$—$v$ are provided for limiting the contractile movement of the sections, although the same effect may be obtained by the edges of the sections coming together.

In Figs. 3 to 7 I have illustrated a device of similar form to a well-known frictional absorber. In these figures 2 indicates an arm which is adapted to be pivoted to the vehicle body and 3 indicates a similar arm adapted to be pivoted to the axle. The arm 2 has formed at its end a disk 4 and the arm 3 a disk 5. At the left of the disk 4 is a disk of leather 6, and at the left of this disk is a metal disk 7. The parts are held together by a bolt 8 which has a non-rotative connection with the disk 7 and disk 5, and a rotative connection with the disks 4 and 6. Preferably the bolt is squared at its points of connection with the disks 5 and 7. A star spring 9 is pressed against the disk 5 by nuts 10 and 11 and serves to place a variable compression upon the parts. Referring to Figs. 5 to 7 the disk 4 is provided with recesses 12 and 13 on its inner face and the disk 5 is provided with a series of spring-pressed friction dogs 14, 15, 16 and 17 which play in recesses 19, 20, 21 and 22. Two of these recesses 19 and 20 are illustrated in Fig. 7. They are tapered in such manner that the dogs 14 and 15 can move in one direction from the position shown in Fig. 7 without exerting any substantial friction upon the parts, while in the opposite direction the dogs are pressed toward the small ends of the recesses and are moved outwardly against the disk 4 moving the disk 5 to the right. This action forces the bolts 8 to the right pressing the disk 7 against the leather disk 6, and as the parts move toward their normal position the bolt 8 is rotated carrying with it the disk 7 and producing a retarding movement. The dogs are preferably held in position by pins 25 passing through slots formed in the dogs. The working faces of the dogs of the disk 4 or both may be roughened to insure a certain engagement sufficient to actuate the dogs, if desired. When one of the dogs is moving out of the recess 12 the other one is playing idly in the recess. The same action takes place with the dogs 16 and 17. The dogs instead of being the shape shown in Fig. 7 may be circular in form, and pivoted eccentrically, or any other shape of dog may be provided.

In the frictional devices illustrated a desired amount of free play of the parts can be obtained by lengthening the recesses $n$ in Fig. 1, and 12 and 13 in Figs. 5 and 7. The retarding effect may be graduated in both these constructions by tapering the walls leading to the recesses.

In Figs. 8 and 9 I have shown an improved form of shock absorber of friction type. In these figures 50 indicates a part of the frame and 51 an axle. 52 is a plate adapted to be bolted to the frame for instance and lying against the plate is a friction disk 53 which is clamped against the plate 52 by a clamping plate 54 actuated by a bolt 55 having a nut 56. The bolt 55 has a flange 57 which bears against the plate 54 with as much pressure as is placed upon it by the nut 56. Mounted upon the outer end of the bolt 55 is a clutch disk 58 containing balls 60. Nuts 61, 62 serve to hold the disk in place while permitting its free rotation. According to this form of the invention the disk 58 can rotate in one direction freely but in the opposite direction it clutches the plate 54 and turns the same against the friction of the disk 53. Any other suitable form of friction means may be employed. According to this embodiment of the invention a connection is made between the axle and disk which is capable of moving in either direction from a normal intermediate point and by such movements rotating the disk in one and the same direction. On movements of the axle approaching the intermediate point from either direction the clutch operates and the frictional retardation is brought into effect.

One embodiment of such means is shown

In this embodiment the disk 58 is provided with a stud 63 on which is pivoted a link 64. On a lug formed on the plate 52 is pivoted a lever 65 and this is preferably connected to the axle by a link 66 which is pivoted on one end to a clamp 67 and on the other end to the lever 65. The arm 68 of the lever 65 is pivoted to the link 64 preferably so that the two parts are in alinement. It will be observed that as the lever 65 is tilted in either direction from its normal, the disk 58 is rotated in the direction of the arrow in Fig. 8. During this movement the clutch does not work. On the reverse movement, however, back to normal the disk is rotated in the opposite direction, and the clutch works with the result that a frictional retardation is obtained.

In Fig. 10 a similar construction is shown. In this figure link 70 is connected to the disk 58 at one end and at its other end to a pivot 73 carried by lever 71. Lever 71 is pivoted to the plate 52 at 74. Movements of the axle are transmitted to the lever 71 through link 66. In this construction the idle movements of the disk 58 take place when the link 70 is pushed in the direction of the arrow, and the clutching movements take place when the link is pulled in the opposite direction.

The mechanisms herein-described may be utilized in connection with any device where it is desired that movements on each side of a given point shall have a different effect. The device of Figs. 8 to 10 provides a mechanism capable of performing such operation by the use of a one-way clutch, and this mechanism is adapted according to the present invention for other purposes than that herein-described.

It is obvious that instead of there being no retardation on the movements away from a given point, a certain amount of retardation may be interposed if desired. This may be done among other ways by arranging a friction washer between the parts 54 and 58, so that the clutch disk is under a constant friction.

In the particular construction shown in Figs. 8, 9 and 10 it will be observed that the nearer the axle moves to the vehicle body or the farther it moves away from the vehicle body, the greater will be the retarding effect. As the axle moves toward the vehicle body, the rotation of the clutch is progressively greater, and the same is true as the axle moves away from the vehicle body. Consequently in this construction the more violent the relative movement, the greater the retard at the beginning of the return movement. This retarding movement gradually grows less until the normal position is reached.

It is obvious that many other forms of device may be constructed to perform the functions necessary to my invention, and I therefore do not wish to be limited in any way to the forms shown.

It is a part of my invention to provide means having different degrees of retarding effect, or combinations of free movement and retarding effect, in a single complete movement of the axle and body from one extreme to the other. The precise movements or parts of movements in which such effects are applied is immaterial, since I believe myself to be the first to adapt a retarding or absorbing device to a normal position of the parts, and to produce different retarding or absorbing effects, or combinations of such effects and free play of the parts, on movements toward or from such positions. I also believe myself to be the first to vary the retarding or absorbing effects during either a complete movement of the parts or during a partial movement thereof.

My invention also provides a construction in which the absorber acts to retard sidewise movements of the body relatively to the running gear. One such construction is shown in Fig. 11, wherein the absorbers 40, 41 are arranged obliquely transversely of the car, instead of longitudinally thereof. Preferably the same absorbers are adapted to retard both the vertical and sidewise movements, one set effecting both results. Other absorbers than that provided by my invention may be arranged as shown, or in any other way which will effect the desired result.

What I claim is:—

1. A frictional shock absorber having non-fluid means for moving in opposite directions from a given point with a lesser friction, and means for moving in a direction toward said point with a greater friction.

2. A frictional shock absorber having non-fluid means for moving in either direction toward a given point with a frictional retardation, and in a direction away from said given point with a lesser or no retardation.

3. A frictional shock absorber having non-fluid means for moving in opposite directions from a given point with a lesser friction, and means for moving toward said point in either direction with a greater friction.

4. The combination with a vehicle of a non-fluid frictional retarding means adapted to operate to produce a lesser or no retardation on movements of the axle and body of the vehicle in either direction from a given normal, and to move with greater friction in a direction toward said normal position.

5. The combination with a vehicle of a non-fluid frictional retarding means adapted to frictionally retard movements of the vehicle body and axle toward a given normal point in either direction, and to operate with a lesser or no retardation in a direction away from a given normal point.

6. The combination with a vehicle of a non-fluid frictional retarding means adapted to operate to produce a lesser or no retardation on movements of the axle and body of the vehicle in either direction from a given normal, and to move with greater friction in either direction toward said normal position.

7. The combination with a clutch and a device which it engages, the clutch being adapted to clutch said device upon a relative movement in one direction and not in the other direction, and means for operating said clutch movable in two directions away from a given point, said means being adapted to actuate the clutch upon movements of said means in either direction with reference to said given point, and upon movements toward said given point to give the clutch an idle movement.

8. The combination of a clutch member and a lever system, said lever system being adapted to move the clutch body in one direction upon movements of said lever system in either direction.

9. The combination of a clutch member, a lever and a link, the link being pivoted to the clutch member and the lever, the pivots of the lever and link being in line when the parts are in a given position so that when the lever is moved in either direction from such given position, the clutch member is moved in a single direction.

10. A non-fluid frictional shock absorber adapted to move in either direction from a definite position, having means for moving in opposite directions from a given point with a lesser or no frictional retardation, and upon return movements toward such given point with a greater retardation, said means gradually lessening its retarding effect as it approaches said given point.

11. The combination with a vehicle of a single non-elastic means for permitting vertical and sidewise movements of the vehicle body and at the same time retarding such movements.

12. The combination with a vehicle of a single means for permitting vertical and sidewise movements of the vehicle body and retarding them, comprising non-elastic absorbing devices arranged so that such movements act directly upon them.

13. The combination with a vehicle of means for permitting sidewise movements of the vehicle body and retarding them, comprising non-elastic absorbing devices arranged obliquely transversely of the vehicle.

14. The combination with a vehicle of retarding devices, each adapted to permit vertical and sidewise movements of the vehicle body, but to retard both such movements, and comprising non-elastic absorbing devices arranged between the vehicle body and axle, said devices being arranged transversely of the vehicle, so that they normally operate upon sidewise and vertical movements of the vehicle body with relation to the axle.

15. The combination with a vehicle of a single non-elastic means for permitting vertical and sidewise movements of the vehicle body and vertical movements of the vehicle body and at the same time retarding such movements.

16. The combination with a vehicle of a single means for permitting sidewise movements of the vehicle body and retarding them, and permitting vertical movements of the vehicle body and retarding them, comprising a non-elastic absorbing device arranged transversely of the vehicle.

In witness whereof, I have hereunto signed my name in the presence of two subscribing witnesses.

EUGENE V. MYERS.

Witnesses:
 FRED WHITE,
 T. F. WALLACE.